(12) United States Patent
Pallas et al.

(10) Patent No.: US 6,512,923 B2
(45) Date of Patent: *Jan. 28, 2003

(54) RADIO COMMUNICATION TERMINAL FOR OPTIMIZING TRANSMISSION OF MESSAGES TO SELECTIVE CALL TRANSCEIVERS AND METHOD THEREFOR

(75) Inventors: Anthony David Pallas, Haltom City, TX (US); James David Lacey, Arlington, TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,678

(22) Filed: Feb. 3, 1999

(65) Prior Publication Data
US 2002/0058508 A1 May 16, 2002

(51) Int. Cl.[7] .................................................. H04Q 7/20
(52) U.S. Cl. ........................ 455/435; 455/456; 455/458
(58) Field of Search ................................. 455/435, 434, 455/433, 456, 458, 445

(56) References Cited

U.S. PATENT DOCUMENTS

| | | | | |
|---|---|---|---|---|
| 4,876,738 A | * | 10/1989 | Selby | 455/33 |
| 5,369,681 A | * | 11/1994 | Boudreau et al. | 455/458 |
| 5,574,728 A | | 11/1996 | Mamaghani et al. | |
| 5,649,289 A | * | 7/1997 | Wang et al. | 455/458 |
| 5,666,652 A | | 9/1997 | Lin | |
| 5,710,972 A | | 1/1998 | Lin | |
| 5,802,469 A | * | 9/1998 | Nounin et al. | 455/422 |
| 5,875,400 A | * | 2/1999 | Madhavapeddy et al. | 455/458 |
| 5,889,474 A | * | 3/1999 | LaDue | 340/825.49 |
| 5,953,667 A | * | 9/1999 | Kauppi | 455/440 |
| 5,963,869 A | * | 10/1999 | Fehnel | 455/511 |
| 6,035,203 A | * | 3/2000 | Hanson | 455/458 |

* cited by examiner

*Primary Examiner*—Lee Nguyen
(74) *Attorney, Agent, or Firm*—Roland K. Bowler, II (57) ABSTRACT

A radio communication terminal operating under a frequency reuse plan for communicating to and from a SCT (116) located in any one of a plurality of communication zones (118) corresponding to the frequency reuse plan, includes: a processing system (412), and a radio transceiver (114) coupled thereto. The processing system is programmed to: (202) cause the radio transceiver to receive a registration request when transmitted from the SCT as the SCT enters a new communication zone, (204) track a history of the SCT's whereabouts according to each registration request received from the SCT, (206) receive a message intended for the SCT, (208) cause the radio transceiver to transmit the message to the SCT, and (210) cause the radio transceiver to wait a predetermined time to receive an acknowledgement message from the SCT indicating that the message was received. If the acknowledgement message is not received, the processing system is programmed to: (212, 214) determine from the history of the SCT's whereabouts, one or more most probable communication zones where the SCT may be located, and (216) cause the radio transceiver to re-transmit the message to the SCT at the one or more most probable communication zones.

20 Claims, 4 Drawing Sheets

RADIO COMMUNICATION TERMINAL FOR OPTIMIZING TRANSMISSION OF MESSAGES TO SELECTIVE CALL TRANSCEIVERS AND METHOD THEREFOR

FIELD OF THE INVENTION

This invention relates in general to two-way radio messaging systems, and particularly to a radio communication terminal for optimizing transmission of messages to selective call transceivers and method therefor.

BACKGROUND OF THE INVENTION

Generally, two-way radio messaging systems (hereinafter referred to as messaging systems) comprise a radio communication terminal and a plurality of portable SCTs (Selective Call Transceivers) for communicating messages thereto. The radio communication terminal uses frequency reuse methods for maximizing message capacity to portable SCTs. Frequency reuse is accomplished by assigning a frequency pattern to a cluster of communication zones, and repeating the frequency pattern across other clusters. When the number of communication zones in a cluster is decreased, frequency reuse is increased, thereby increasing system capacity. As a means for tracking SCTs in the messaging system, each SCT is programmed to request registration from the radio communication terminal each time the SCT enters a new zone. By knowing the location of each SCT, the messaging system is able to optimally use the frequency reuse plan.

Generally, when a message is transmitted by the messaging system to a SCT, the SCT responds with an acknowledgement indicating to the messaging system that the message has been received. However, it is not uncommon for the radio communication terminal to not receive a return acknowledgement from the SCT. This is because portable battery-operated SCTs have very little power for transmitting inbound messages over long distances, and depending on the distribution of receivers of the radio communication terminal, it is possible that a SCT will be situated in a location where receiver reception is poor. In contrast, the probability of outbound messages being received by SCTs from the radio communication terminal is substantially higher, because the power used to transmit messages to the SCT is comparably high.

To account for the situation where the radio communication terminal fails to receive an acknowledgement message from a SCT, prior art systems employ what is generally termed in common parlance as a fallback delivery strategy. Under this strategy, the messaging system reverts to a one-way communication strategy in which the radio communication terminal retransmits the message to the non-responding SCT over a pre-selected number of communication zones. Although message delivery is not guaranteed under this strategy, the probability of the SCT receiving the message is increased as a result of broadcasting the message over several communication zones.

Although this strategy is better than not retransmitting the message at all, the approach of unintelligently retransmitting the message over a pre-selected number of communication zones is not an optimal approach for locating a non-responsive SCT. Accordingly, a need exists in the prior art for improving the strategy of locating non-responsive SCTs.

DESCRIPTION OF THE PREFERRED EMBODIMENT

Figure 1:
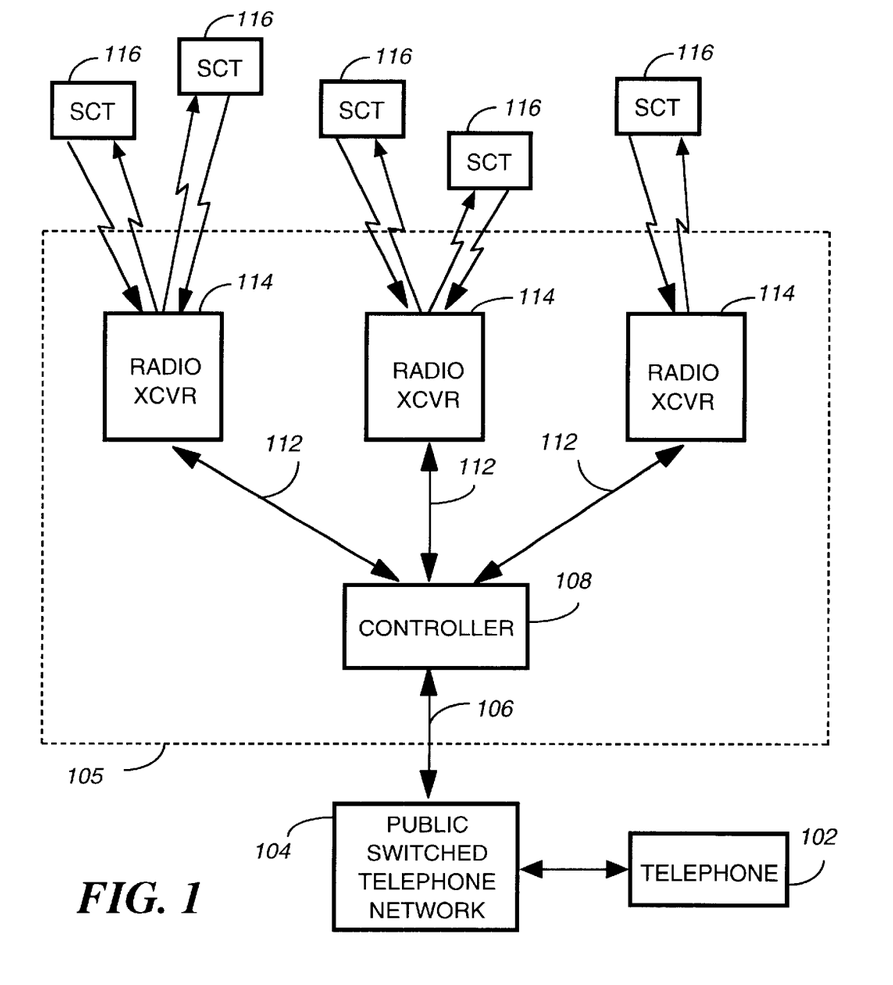
FIG. 1 is an electrical block diagram of a radio communication system.

FIG. 1 is an electrical block diagram of a radio communication system (hereinafter referred to as a messaging system) according to the present invention. The messaging system comprises a radio communication terminal 105 including a plurality of radio transceivers 114, and a controller 108. The radio transceivers 114 are used for communicating messages to a plurality of SCTs 116 (Selective Call Transceivers) using conventional FM transmission means. It will be appreciated that, alternatively, AM transmission means singly or in combination with FM transmission means can also be used. Radio communications between the radio transceivers 114 and the SCTs 116 preferably conform to the FLEX family of protocols (FLEX is a trademark of Motorola, Inc.), and particularly, to the ReFLEX digital selective call signaling protocol (ReFLEX is a trademark of Motorola, Inc.). The ReFLEX protocol is presently in use by various system operators in the United States. It will be appreciated that other communication protocols that are suitable to this invention can be used. However, in the discussion below it is assumed that the ReFLEX protocol is used.

For receiving messages from callers using conventional telephone units 102, the controller 108 is coupled to a public switched telephone network (PSTN) 104 by way of one or more conventional telephone links 106. The controller 108 coordinates messages it receives from the PSTN 104, and sends such messages to the radio transceivers 114 by way of conventional communication links 112 for transmission to the SCTs 116. Under ReFLEX protocol, the radio communication terminal 105 operates under a frequency reuse plan for communicating to and from a SCT 116 located in any one of a plurality of communication zones 118 corresponding to the frequency reuse plan.

Figure 2:
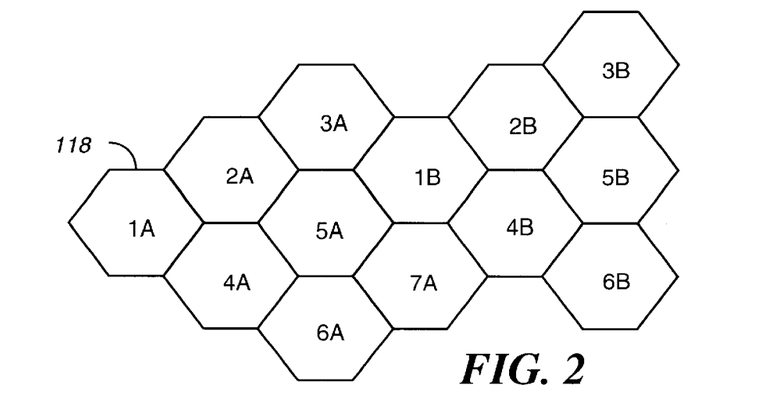
FIG. 2 illustrates a frequency reuse plan according to the present invention.

FIG. 2 illustrates, by way of example, a frequency reuse plan used by the radio communication terminal 105 according to the present invention. This example illustrates a seven frequency reuse plan, whereby the communication zones 118 are broken down into clusters of seven (e.g., 1A–7A, 1B–7B, 1C–7C, and so on). Principally, the cluster of zones 1A–7A use independent frequencies, which are shared by the other clusters of zones 1B–7B, etc. By separating zone 1A from 1B at a sufficient distance to minimize RF (Radio Frequency) interference, zones 1A and 1B may reuse the same transmitting and receiving frequency(ies) for two-way communication with SCTs 116.

Figure 3:
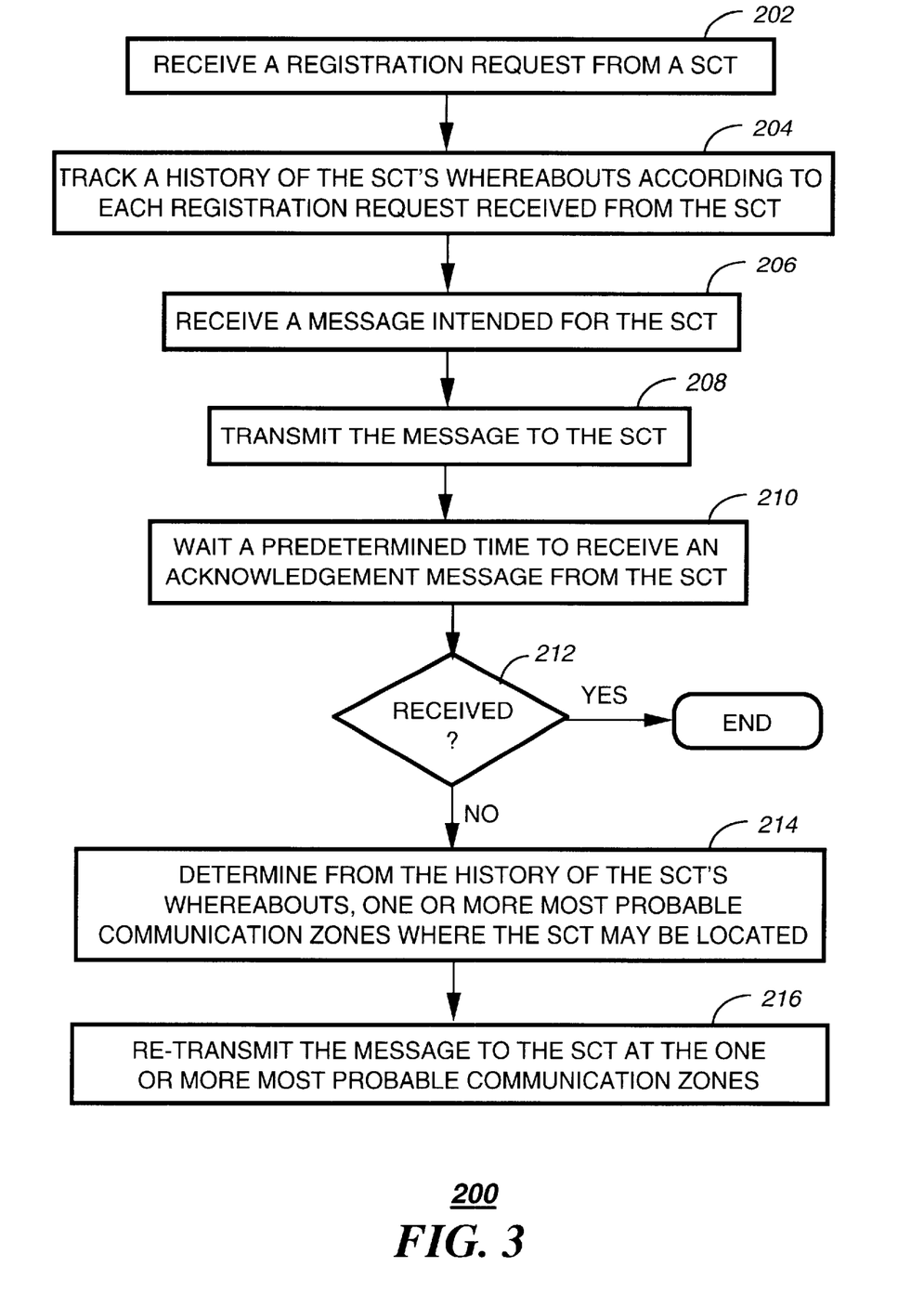
FIG. 3 is a flowchart depicting how the controller of FIG. 1 is programmed to optimally locate a non-responsive SCT (Selective Call Transceiver) according to the present invention.

FIG. 3 is a flowchart 200 depicting how the controller of FIG. 1 is programmed to optimally locate a non-responsive SCT 116 according to the present invention. Flowchart 200 begins with step 202 where the controller 108 causes the radio transceiver 114 to receive a registration request when transmitted from the SCT 116 as a result of the SCT 116 entering a new communication zone. In step 204, the controller 108 tracks a history of the SCT's 116 whereabouts according to each registration request received from the SCT 116. Each stored-entry indicates a corresponding communication zone 118 entered by the SCT 116. Upon receiving a message from, for example, a caller using the PSTN 104, in step 206, the controller 108 proceeds to step 208 where it causes the radio transceiver 114 to transmit the message to the SCT 116 according to the last known location of the SCT 116 and the frequency reuse plan used by the messaging system.

In step 210, the controller 108 causes the radio transceiver 114 to wait a predetermined time (e.g., no more than a 4 minute ReFLEX cycle) to receive an acknowledgement message from the SCT 116 indicating that the message was received. If reception of an acknowledgement message is detected in step 212, then the controller 108 assumes the message transfer process is completed. Otherwise, the controller 108 proceeds to step 214 where it determines from the history of the SCT's 116 whereabouts, one or more most probable communication zones 118 where the SCT 116 may be located. Once the controller 108 has made this determination, it causes the radio transceiver 114, in step 216, to re-transmit the message to the SCT 116 at the one or more most probable communication zones 118.

Figure 4:
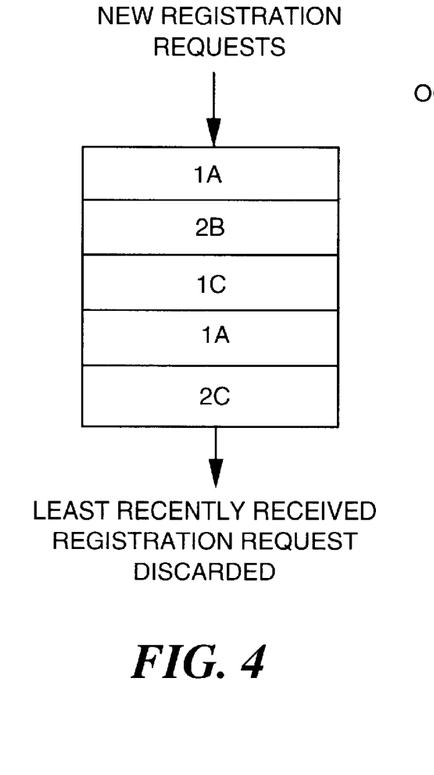
FIGS. 4–6 illustrate three alternative embodiments for tracking and determining the SCT's whereabouts according to the present invention.
Figure 5:
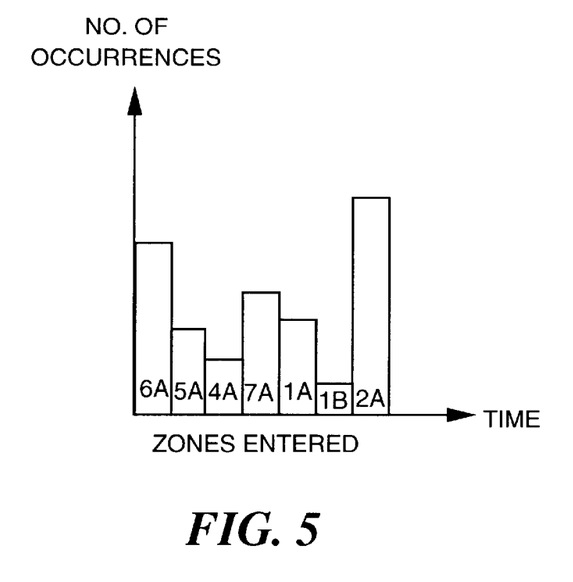
Figure 6:
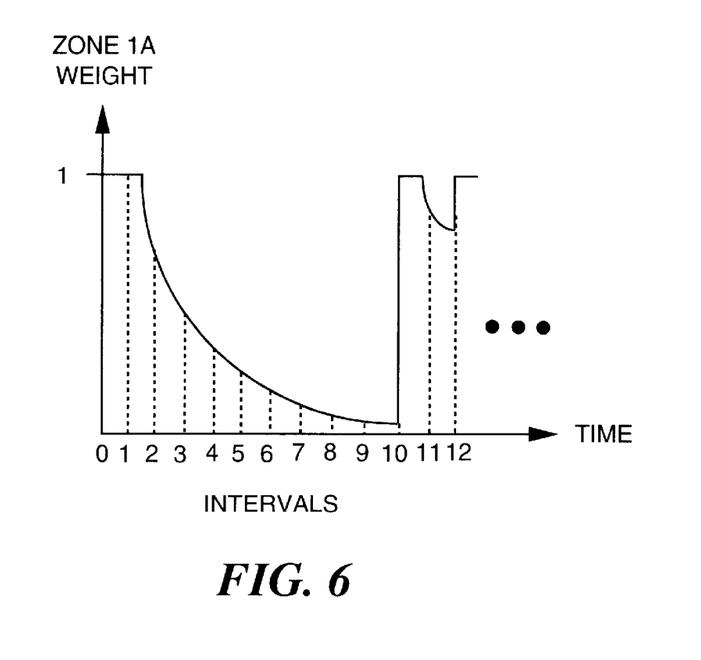

FIGS. 4–6 illustrate three alternative embodiments of steps 204 and 214 for tracking and determining the SCT's 116 whereabouts according to the present invention. Under a first embodiment, registration requests are stored in ascending order each time one is received from the SCT 116. Each stored-entry indicates a communication zone 118. This method of storing registration requests is much like the stack method used by microprocessors for storing a return addresses upon servicing an interrupt request. The difference, however, is that the buffer illustrated in FIG. 4 has a limited number of entries, and when the buffer is full, the least recent entry is discarded to make room for new registration requests.

In the present example, the buffer is limited to five entries. The top entry, representative of zone 1A, is the most recently received registration request, and the bottom entry, representative of zone 2C, is the least recently received registration request. When the controller 108 receives a new registration request from the SCT 116, all the entries bubble down the stack by one position, and the least recently received entry, which in this example is zone 2C, is discarded and replaced with zone 1A. To determine one or more most probable communication zones 118 where the SCT 116 may be located, the controller 108 can be programmed, for example, to select the top two most recent locations of the SCT 116, which in this example is represented by zones 1A and 1B. Hence, in step 216, the controller 108 would cause the radio transceiver 114 to re-transmit the message to the non-responsive SCT 116 at zones 1A and 1B.

FIG. 5 illustrates a second embodiment for tracking and determining the location of a non-responsive SCT 116. In this embodiment, the controller 108 tracks each zone 118 that the SCT 116 enters and, in addition, tracks the number of occurrences of messages transmitted to the SCT 116 within each zone 118. To determine which zone 118 the non-responsive SCT 116 may be located, the controller 108 can be programmed to, for example, select the top two zones 118 having the highest occurrences of messages transmitted to the SCT 116, and the top two most recent zones 118 where the SCT 116 was located. Under this criteria, zones 2A and 6A would be selected for having the highest occurrences of messages transmitted, and zones 2A and 1B would be selected as being the most recent zones 118 where the SCT 116 was last positioned. Alternatively, the controller 108 can be programmed to apply a probability distribution function (e.g., Gaussian or Poisson distribution functions) to the histogram of FIG. 5. From this application the location of the SCT 116 can be determined as a function of the degree of confidence provided by the probability distribution function.

As yet another embodiment, the controller 108 is programmed to track each zone 118 that the SCT 116 enters including the number of occurrences of messages transmitted to the SCT 116 in each zone 118, apply a predetermined weight (e.g., unity) to each zone 118, and periodically decrease at predetermined intervals (e.g., 24 hours) the weight given to each zone 118 when the number of occurrences of messages transmitted to the SCT 116 is less than a predetermined threshold of occurrences. This embodiment is illustrated by way of example in FIG. 6. The example shown only applies to a single zone—here zone 1A. This approach is applied independently to each zone 118 that the controller 108 records.

As illustrated, at the first interval, the weight given to zone 1A remains at unity. This interval is representative of the controller 108 having just received a registration request for zone 1A from the SCT 116. At the second interval, the controller 108 determines if the number of occurrences of messages transmitted to the SCT 116 within zone 1A is at a predetermined threshold (e.g., one page per day). If the number of pages transmitted to the SCT 116 within the predetermined interval is less than the predetermined threshold, then the controller 108 decreases the weight. Otherwise, the weight remains unchanged. In this example, it is assumed that at intervals 2–9, the controller 108 determined that the number of occurrences of messages transmitted to the SCT 116 was below the predetermined threshold. Additionally, this example shows that the weights are decreased according to an exponentially decaying function. It will be appreciated, however, that other functions suitable with the present invention may be used. Also, noted in the illustration of FIG. 6, a weight that has been previously decreased may return to its original value once the controller 108 detects that the SCT 116 has received more messages than the prescribed predetermined threshold. This event is shown both at intervals 10 and 12 in FIG. 6.

It should be evident from the foregoing embodiments of the present invention, that these embodiments overcome the disadvantages discussed in the prior art above. It should also be noted that combinations of the foregoing embodiments should also be considered within the scope of the present invention. The present invention is advantageous over the prior art as a result of substantially increasing the probability of locating non-responsive SCTs 116. As a consequence of the present invention, communications to SCTs 116 is more reliable.

Figure 7:
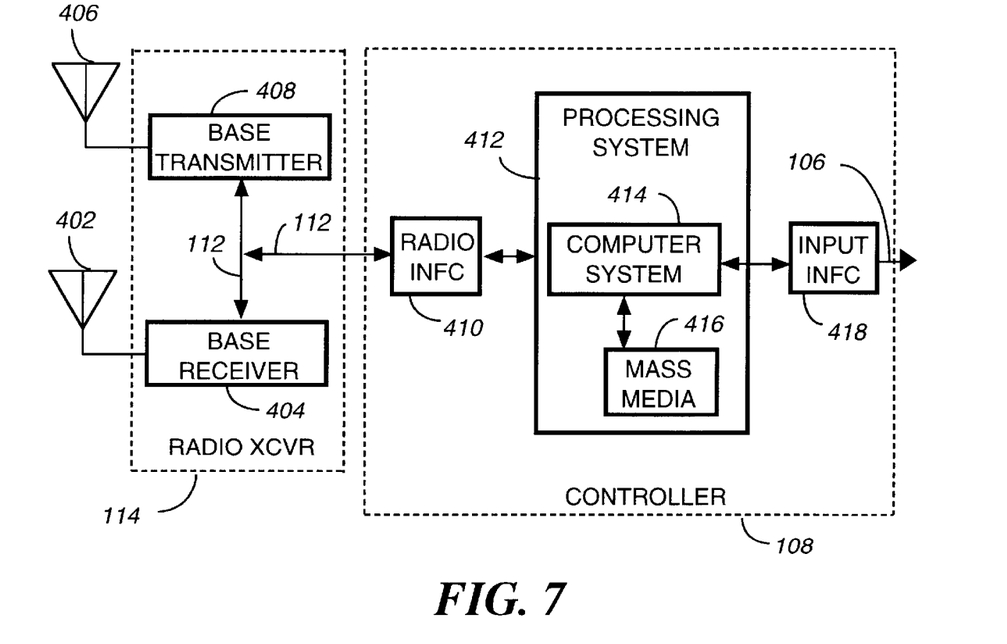
FIG. 7 is an electrical block diagram of the controller and radio transceiver of FIG. 1 according to the present invention.

FIG. 7 is an electrical block diagram of the controller 108 and a single radio transceiver 114 for illustration purposes. It will be appreciated that, normally, the controller 108 is coupled to a plurality of radio transceivers 114 as shown in FIG. 1. The controller 108 includes a processing system 412, an input interface 418, and a radio interface 410. The hardware elements of the controller 108 are preferably a combination of the Wireless Messaging Gateway (WMG™) Administrator! paging terminal, and the RF-Conductor!™ message distributor—both manufactured by Motorola, Inc. It will be appreciated that other similar hardware can be used for the controller 108.

The processing system 412 is used for directing operation of the controller 108. To accomplish this task, the processing system 412 includes a conventional computer system 414 and a conventional mass storage media 416. The computer system 414 is programmed by software stored in the mass storage media 416. The software operates as depicted in the flowchart 200 of FIG. 3. The input interface 418 is coupled to the processing system 412 by way of the telephone link 106 for receiving messages from the PSTN 104. The radio interface 410 is coupled to the processing system 412 for sending and receiving messages to and from the radio transceivers 114.

The radio transceiver 114 is coupled to the processing system 412 for transmitting messages to SCTs 116 and for receiving responses from SCTs 116. The radio transceiver 114 comprises at least one base transmitter 408 and at least one base receiver 404 coupled to transmitter and receiver antennas 406, 402, respectively. The hardware of the radio transceivers 114 is preferably a combination of the Nucleus® Orchestra! transmitter and RF-Audience!™ receivers manufactured by Motorola, Inc. It will be appreciated that other similar hardware can be used for the radio transceivers 114.

The base transmitter 408 transmits messages to SCTs 116 using conventional FM transmission means such as, for example, frequency shift keyed FM. The base receiver 404 receives messages from SCTs 116 using conventional means for receiving FM signals. Messages received from SCTs 116 are communicated to the radio interface 410, which in turn relays the messages to the processing system 412 for further processing. The base transmitter 408 and the base receiver 404 are preferably not co-located in order reduce noise interference between them.

Figure 8:
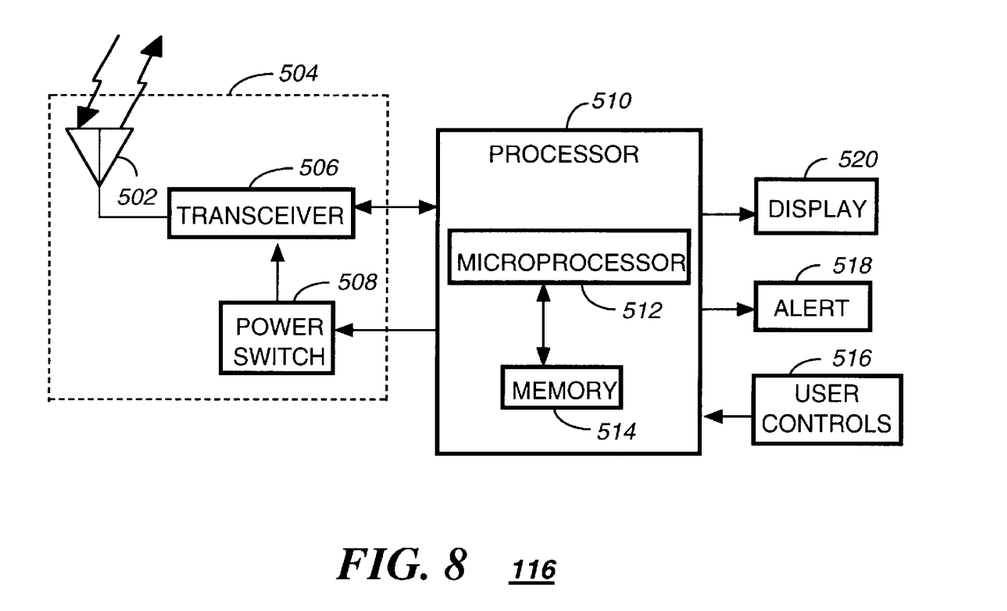
FIG. 8 is an electrical block diagram of the SCT according to the present invention.

FIG. 8 is an electrical block diagram of the SCT 116 discussed above. The SCT 116 comprises circuitry 504 for communicating with the messaging system, a processor 510 for controlling operation of SCT 116, user controls 516, an alerting device 518, and a display 520.

The circuitry 504 is used for receiving messages from the messaging system, and for transmitting response messages to the messaging system under the control of the processor 510. To send and receive messages, the circuitry 504 includes a transceiver antenna 502, a transceiver 506, and a power switch 508. The transceiver antenna 502 is coupled to the transceiver 506 for transmitting and receiving FM messages to and from the messaging system. Upon receiving a FM message from the messaging system, the transceiver 506 demodulates the FM message in a conventional manner, thereby providing the processor 510 a demodulated message. Similarly, when a response message is to be transmitted, the processor 510 causes the transceiver 506 to modulate the response message into a response signal that is transmitted on the transceiver antenna 502. The power switch 508 is a conventional MOS switch coupled to the processor 510 for controlling power supplied to the transceiver 506, thereby providing a battery saving function.

To perform the necessary functions of SCT 116, the processor 510 includes a microprocessor 512, and a memory 514. The microprocessor 512 is, for example, a M68HC08 micro-controller manufactured by Motorola, Inc. The memory 514 preferably includes a conventional read-only memory (ROM) and a conventional random-access memory (RAM).

The microprocessor 512 is programmed by way of the memory 514 for processing selective call messages intended to be displayed to the user of SCT 116. Upon receiving a selective call message, for example, the microprocessor 512 samples the demodulated message generated by the transceiver 506. The microprocessor 512 then decodes an address in the demodulated message, compares the decoded address with one or more addresses stored in the memory 514, and when a match is detected, proceeds to process the remaining portion of the message.

Once the microprocessor 512 has processed the message, it stores the message in the memory 514, and a call alerting signal is generated to alert a user that a message has been received. The call alerting signal is directed to a conventional audible or tactile alerting device 518 for generating an audible or tactile call alerting signal. By the use of appropriate functions provided by the user controls 516, the received message is recovered from the memory 514, and displayed on a display 520. The display 520 is, for example, a conventional liquid crystal display (LCD). Alternatively, when the message is a voice message, the message is played out on a conventional audio circuit (not shown in FIG. 8) that is included in SCT 116.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a radio communication terminal comprising a controller, a plurality of base receivers, and a plurality of base transmitters, operating under a frequency reuse plan for communicating to and from a SCT (selective call ransceiver) located in any one of a plurality of communication zones corresponding to the frequency reuse plan, a method for optimizing transmission of messages to the SCTs, comprising:

receiving a registration request from the SCT each time the SCT enters a new communication zone;

tracking a time dependent history of the SCT's whereabouts according to each registration request received from the SCT;

receiving a message intended for the SCT;

transmitting the message to the SCT;

waiting a predetermined time to receive an acknowledgement message from the SCT indicating that the message seas received;

if the acknowledgement message is not received, determining from the history of the SCT's whereabouts one or more most probable communication zones where the SCT may be located; and re-transmitting the message to the SCT at the one or more most probable communication zones.

2. The method as recited in claim 1, wherein the step of tracking the history of the SCT's whereabouts comprises the step of storing in ascending order each registration request received from the SCT, each stored-entry indicating a communication zone entered by the SCT.

3. The method as recited in claim 2, wherein the foregoing storing step comprises the steps of:

allocating a buffer in the radio communication terminal having a predetermined number of entries for storing each of the registration requests; and discarding the least recently received registration request when a registration request is received and all the predetermined number of entries of the buffer are occupied.

4. The method as recited in claim 2, wherein the step of determining the SCT's whereabouts comprises the step of selecting one or more communication zones according to a corresponding one or more most recently stored registration requests.

5. The method as recited in claim 1, wherein the step of tracking the history of the SCT's whereabouts comprises the steps of:
    storing each registration request received from the SCT, each stored-entry indicating a communication zone entered by the SCT; and
    tracking for each registration request received and stored a corresponding number of occurrences of messages transmitted to the SCT within a corresponding communication zone.

6. The method as recited in claim 5, wherein the step of determining the SCT's whereabouts comprises the step of selecting one or more communication zones corresponding to one or more registration requests, each registration request having a high number of occurrences of messages transmitted to the SCT within a corresponding communication zone.

7. The method as recited in claim 5, wherein the step of determining the SCT's whereabouts comprises the steps of:
    applying a probability distribution function the number of occurrences of messages transmitted to the SCT for each registration request stored; and
    determining according to the probability distribution function a degree of confidence that the SCT is located in one or more most probable communication zones.

8. The method as recited in claim 1, wherein the step of tracking the history of the SCT's whereabouts comprises the steps of:
    storing each registration request received from the SCT, each stored-entry indicating a corresponding communication zone entered by the SCT;
    for each registration request stored,
        applying a predetermined weight;
        periodically tracking at predetermined intervals a corresponding number of occurrences of messages transmitted to the SCT within the corresponding communication zone; and
        decreasing the weight applied to a registration request when the corresponding number of occurrences of messages transmitted to the SCT within the corresponding communication zone is less than a predetermined threshold of occurrences.

9. The method as recited in claim 8, wherein the step of decreasing a corresponding weight of a stored registration request follows an exponentially decaying function.

10. A radio communication terminal operating under a frequency reuse plan for communicating to and from a SCT (selective call transceiver) located in any one of a plurality of communication zones corresponding to the frequency reuse plan, comprising:
    a processing system for directing operation of a controller;
    a base transmitter coupled to the processing system for transmitting messages to the SCT;
    a base receiver coupled to the processing system for receiving messages from the SCT, wherein the processing system is programmed to:
        cause the base receiver to receive a registration request when transmitted from the SCT, wherein each SCT transmission occurs as a result of the SCT entering a new communication zone;
        track a time dependent history of the SCT's whereabouts according to each registration request received from the SCT;
        receive a message intended for the SCT;
        cause the base transmitter to transmit the message to the SCT;
        cause the base receiver to wait a predetermined time to receive an acknowledgement message from the SCT indicating that the message was received;
        if the acknowledgement message is not received, determine from the history of the SCT's whereabouts one or more most probable communication zones where the SCT may be located; and
        cause the base transmitter to transmit the message to the SCT at the one or more most probable communication zones.

11. A radio communication method operating under a frequency reuse plan for communicating with a selective call transceiver located in any one of a plurality of communication zones, comprising:
    receiving a registration request from the selective call transceiver each time the selective call transceiver enters a new communication zone;
    tracking a time dependent history of the location of the selective call transceiver in the plurality of communication zones by storing when registration requests are received from the selective call transceiver and storing the corresponding communication zones for which the registration requests were received;
    determining a communication zone where the selective call transceiver is probably located at a particular time from the time dependent history of the selective call transceiver.

12. The method of claim 11, tracking the time dependent history of the location of the selective call transceiver by storing in which communication zone the selective call transceiver is most often located at a particular time.

13. The method of claim 11, determining a communication zone where the selective call transceiver is probably located by selecting the communication zone for which the most registration requests have been received historically from the selective call transceiver for the particular time.

14. The method of claim 11, tracking the time dependent history of the location of the selective call transceiver by storing the number of communication requests from the selective call transceiver for each of the, communication zones at particular times.

15. The method of claim 14, determining a communication zone where the selective call transceiver is probably located by selecting the communication zone for which the most registration requests were received historically from the selective call transceiver at the particular time.

16. The method of claim 11, determining a communication zone where the selective call transceiver is probably located by applying a probability distribution function to a number of occurrences of messages transmitted to the selective call transceiver for each registration request stored, and determining according to the probability distribution function a degree of confidence that the selective call transceiver is located in one or more most probable communication zones.

17. The method of claim 11,
    transmitting a message to the selective call transceiver in the last known communication zone of the selective call transceiver, without transmitting the message to other communication zones,
    if an acknowledgement is not received within a predetermined time from the selective call transceiver in response to the message transmitted, determining a communication zone where the selective call transceiver is probably located at a particular time from the time dependent history of the selective call transceiver, and re-transmitting the message to the selective call transceiver at the communication zone identified, without transmitting the message to the other communication zones.

18. A radio communication method, comprising:

receiving a registration request from a mobile wireless communication device each time the mobile wireless communication enters one of a plurality of communication zones;

tracking a time dependent history of a plurality of registration requests of the mobile wireless communication in the plurality of communication zones;

determining a communication zone where the mobile wireless communication is probably located at a particular time from the time dependent history of the plurality of registration requests tracked.

19. The method of claim 18, tracking the time dependent history of the registration requests of the mobile wireless communication in the plurality of communication zones by storing when each of the plurality of registration requests is received and storing the communication zone for which the corresponding registration request is received.

20. The method of claim 18, paging the mobile wireless communication by transmitting a message to the mobile wireless communication at the communication zone where the mobile wireless communication is probably located.

* * * * *

UNITED STATES PATENT AND TRADEMARK OFFICE
CERTIFICATE OF CORRECTION

PATENT NO. : 6,512,923 B2
DATED : January 28, 2003
INVENTOR(S) : Pallas, Anthony D. et al.

It is certified that error appears in the above-identified patent and that said Letters Patent is hereby corrected as shown below:

<u>Column 6,</u>
Line 32, change "ransceiver" to -- transceiver --
Line 46, change "seas" to -- was --

<u>Column 8,</u>
Line 14, change "transmit" to -- re-transmit --

Signed and Sealed this

Tenth Day of June, 2003

JAMES E. ROGAN
*Director of the United States Patent and Trademark Office*